United States Patent

Rose, Jr.

[15] 3,647,951

[45] Mar. 7, 1972

[54] EDIT CONTROL CIRCUIT FOR VIDEO TAPE RECORD SYSTEM

[72] Inventor: Marshall G. Rose, Jr., Cupertino, Calif.

[73] Assignee: Ampex Corporation, Redwood City, Calif.

[22] Filed: Nov. 9, 1970

[21] Appl. No.: 87,905

[52] U.S. Cl. ....................................178/6.6 A, 179/100.2 B

[51] Int. Cl. ....................G11b 5/02, G11b 27/08, H04n 5/78

[58] Field of Search ................178/6.6 A, 6.6 P; 179/100.2 B

[56] References Cited

UNITED STATES PATENTS 3,461,248 8/1969 Kane ................................179/100.2 B

*Primary Examiner*—Bernard Konick

*Assistant Examiner*—Steven B. Pokotilow

*Attorney*—Robert G. Clay

[57] ABSTRACT

In order to allow for an unlimited number of short duration edits on a video tape recorder of the type having physically separated video record/reproduce and erase heads, a multistage electronic shift register clocked at the video signal frame rate is employed to develop the necessary timing signals for operating the various head assemblies at the proper times in response to a common edit command signal. The input to the shift register receives an edit pulse signal of desired duration and in response thereto develops at its various output stages a number of corresponding timing signals each having a precisely phased delay corresponding to a multiple number of video frame periods with each such signal being connected to control operation of one or more of the transducing heads.

4 Claims, 4 Drawing Figures

INVENTOR.
MARSHALL G. ROSE

BY Larry A. Jackson

ATTORNEY

INVENTOR
MARSHALL G. ROSE

BY [signature]

ATTORNEY

EDIT CONTROL CIRCUIT FOR VIDEO TAPE RECORD SYSTEM

In general, the present invention relates to editing systems for video tape recorders of the type having a rotary scan video record/reproduce head assembly and a stationary video erase head spaced upstream in the tape path from the rotary head. More specifically, the present invention concerns the circuitry employed for timing the various edit operations to automatically compensate for the physical spacing between the various transducer heads involved in carrying out the edit operation.

Electronic editing systems for video tape recording equipment have been developed in order to avoid the time consuming and rather delicate task of physically splicing video tape recordings at the desired edit points. Currently, circuitry for such electronic editors employ electronic counters for developing the timing delay functions necessary to operate the variously positioned record, reproduce and erase transducers. Such an arrangement is described in U.S. Pat. No. 3,342,932 assigned to the assignee of the present invention; a further example of counter circuitry used in this manner is disclosed in U.S. Pat. No. 3,463,877, also assigned to the present assignee. In each of these and in other existing editing systems, the electronic counting devices function as timing means so as to operate the various transducer heads in a coordinated sequence so that the material erased from the tape and the new material inserted thereon are properly "spliced" with the original recording. These timing operations are somewhat complicated by reason of the particular magnetic record format employed for video tape. Such format is characterized by a series of angulated or transverse magnetic tape tracks for the video signal, a longitudinal audio track, and a longitudinal cue track which carries selectively positioned command signals for effecting desired edit operations. Furthermore, by virtue of the spacing between the various heads associated with these tracks, the magnetic recordings or erasures corresponding to any given tape time occur at different longitudinal locations on the magnetic tape. Such diversities must be coordinated by a timing circuit, responsive to a common edit command signal and functioning to operate the various transducer heads at the proper relative times. Electronic counters heretofore employed for this timing function, while entirely satisfactory for edit operations of relatively long duration and of substantial time spacing therebetween, have been found at a disadvantage in effecting short duration edits consisting for example of a few video frames and in providing edits closely spaced in time.

Accordingly, it is an object of the present invention to provide an electronic circuit having substantially greater flexibility in performing video tape editing operations; and in particular to provide such a circuit capable of making video tape edits of duration and spacing on the same order of time as the video frame period.

A further disadvantage of existing editing circuits relates to the inefficiency of electronic counters for performing the relative timing functions necessary for the numerous and variously spaced transducer heads. For example, on a sophisticated video tape transport, not only is the stationary video erase head displaced from the transverse rotary record/reproduce heads, but also the audio record/erase and cue record/erase heads each have unique stations along the tape path.

Thus it is a further object of the present invention to provide a timing circuit capable of effecting a variety of different timing functions in response to a common edit command signal.

These and other objects are achieved in accordance with the present invention by employing an electronic shift register as the basic timing circuit wherein the shift register is comprised of a plurality of bit stages, each having an output for operating one of the transducer head assemblies, and the register having a common clocking input responsive to a pulse train representing the frame locations of the recorded video signal. The input or first stage of the shift register is adapted to receive an edit command signal which for short duration edits appears as a rectangular pulse signal having a leading edge representing the start of a desired edit operation, referred to as an in-going splice, and a trailing edge representing the stop of such edit operation, referred to as an out-going splice. This edit command pulse is shifted along the register at the clock rate, which is also the video frame rate, and thus appears downstream as a delayed pulse signal wherein the amount of delay is determined by the number of stages through which the signal has passed. By connecting the various transducer heads to appropriate stages of the shift register, the desired relative timing in response to the edit command signal is automatically achieved. Importantly, by clocking the shift register at the frame rate, it is possible to perform edit operations having a duration as short as one video frame and to perform an unlimited succession of edit operations with a spacing of one video frame duration therebetween. As no purpose is served in resolving the edit operations to less than a video frame period, the system of the present invention attains the highest desirable degree of resolution while holding the number of required bit stages in the shift register to an efficient minimum.

In contrast to the operation of an electronic counter, the shift register is always ready to receive a succeeding edit command signal even though the timing functions of the preceding edit command signal have not been completed. For example, if it is desired to make two sequential edits, each of one video frame duration, the present invention provides for receiving the first edit command signal of one frame's length at the input stage and clocking such signal into the following bit stage as the input bit stage is prepared for receiving the succeeding edit signal. Thus, unlike a counter which once loaded with an edit command signal must complete its cycle before a new edit command signal can be processed, the shift register of the present invention is capable of receiving any number of closely spaced edit commands.

Portions of the edit circuitry disclosed herein are also disclosed in a concurrently filed and now copending U.S. Patent application Ser. No. 87,709 for METHOD AND CIRCUIT FOR ADJUSTING THE VIDEO ERASE TIMING IN AN ELECTRONIC EDITING SYSTEM FOR A TRANSVERSE SCAN VIDEO TAPE RECORDER, by myself and Charles W. Crum, filed Nov. 9, 1970, and assigned to the assignee of the present application.

These and other objects, features and advantages of the invention will become apparent from the following description and accompanying drawings respectively describing and illustrating the preferred embodiment of the invention, wherein.

Figure 1:
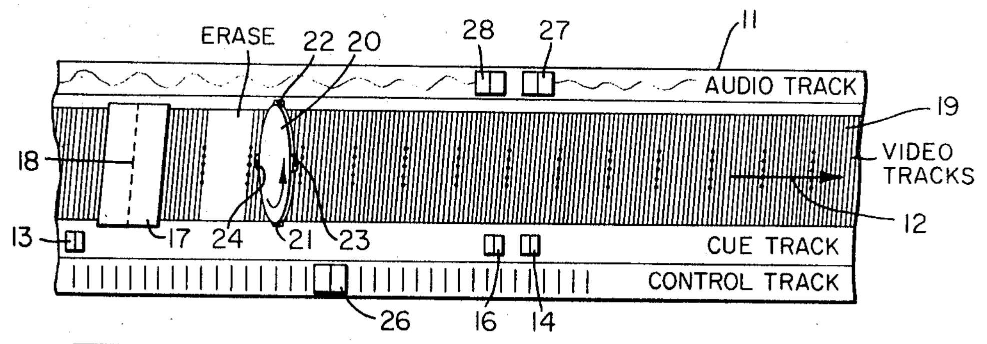
FIG. 1 is a schematic view illustrating the component layout and tape record format associated with a quadraplex transverse scan video tape recorder.

With reference to FIG. 1, the herein described preferred embodiment of the present invention is adapted to operate in the environment of a quadraplex transverse scan video tape recorder designed to transport a magnetic tape 11 in a direction 12 such that the tape traverses a path which passes the various following transducer head components. The first transducer in the tape path is an advance cue signal reproduce head 13 which is adapted to read a cue tone signal previously recorded on the cue track by a cue record/reproduce head 14 located downstream in the tape path. A cue erase head 16 is provided slightly upstream from head 14 for erasing this track. In relation to the present invention, the cue track is employed for marking the desired edit points on the video tape as it is monitored during a video reproduce mode. The recorded cue signal, which in this instance is a short duration burst of a relatively high-frequency signal, provides for initiating the actual edit erase and record operations when the tape is rerun after the desired edit points have thus been marked. Following advance cue head 13, a stationary video erase head 17 is mounted such that its erase gap 18 is in parallelism with the slightly angulated video record tracks 19. In this manner, a clean erasure transition can be made between any pair of adjacent transverse video tracks. Downstream from erase head 17 is the quadraplex record/reproduce video head assembly 20, which consists of four transducer heads 21, 22, 23 and 24 mounted in quadrature relation for rotation in a plane transverse to the longitudinal axis of tape 11. The rotation of assembly 20 and the simultaneous longitudinal movement of tape 11 results in the slight angulation of the otherwise transverse tracks. Proximate assembly 20 is a control track record/reproduce head 26 which functions to record a control signal on the control track during recording of the video tape and thereafter control the speed of the tape during reproduce modes at a desired standard rate. Substantially in line with cue record and reproduce head 14 is an audio record and reproduce head 27 disposed in cooperative registration with the audio track. Similarly, an audio erase head 28 is disposed in longitudinal registration with head 27 and in lateral alignment with cue erase head 16.

Assume that tape 11 has been monitored and the desired edit points marked by applying a signal to the cue track through head 14. It will be noted that at the time the cue track was marked, video record reproduce assembly 20 was reproducing a video signal upstream therefrom. In the present invention and in existing systems, this head spacing and other head separations are automatically compensated during the edit operations by developing suitable timing functions measured relative to the occurrence of the cue signal as reproduced by advance cue read head 13. The additional cue read head 13 located in the position shown is necessary in order to give advance warning to the system of an approaching edit point. Upon the occurrence of the reproduce cue tone at head 13, a timing sequence is initiated which for example may provide first for the energization of erase head 17 and thereafter the switching of assembly 20 from a reproduce mode to a record mode. Approximately at the time the rotary heads are switched, audio erase head 28 is energized and thereafter audio record/reproduce head 27 is switched from a reproduce to a record mode. This sequence of operations produces the in-going edit splice and the reverse of this sequence effects the out-going splice.

Figures 2, 4:
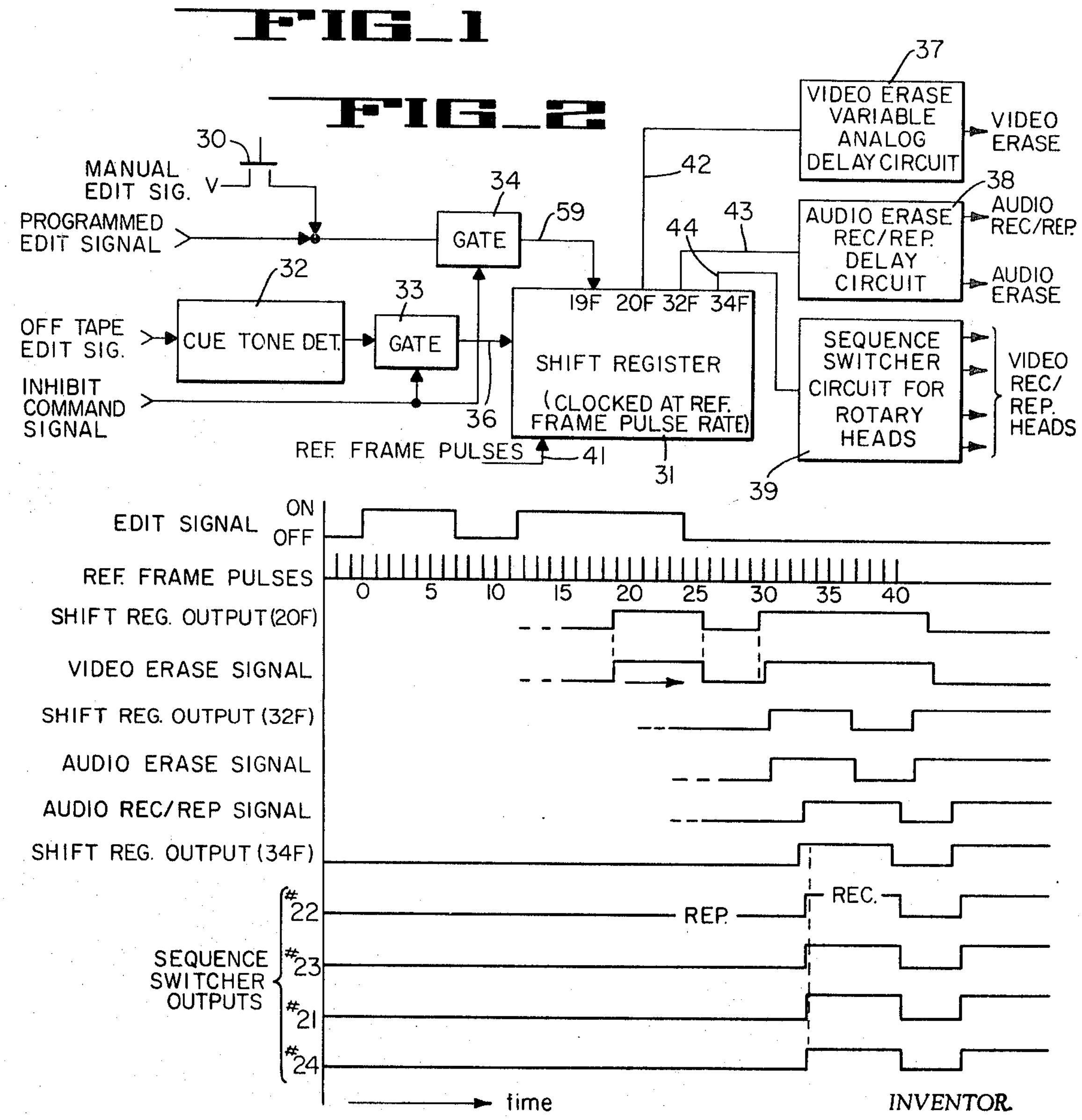
FIG. 2 is a block diagram illustrating the basic components of the edit circuit constructed and operating in accordance with the present invention.
FIG. 4 is a timing diagram illustrating various waveforms occurring within the circuits of FIGS. 2 and 3.

With reference to FIG. 2, a generalized block diagram of the timing circuit constructed in accordance with the present invention is illustrated wherein a shift register 31 performs the essential edit timing functions in response to one of several possible edit command inputs, such as provided by a manual edit signal, an automatically computed or programmed edit signal, or an off-tape edit signal carried by the tape cue track. The manual edit signal is developed by a pushbutton switch 30 while the programmed edit signal may be provided by a separate computer unit which automatically determines the edit points in accordance with a selected program. Such a special purpose computer adapted for video tape editing operations is for example marketed by Ampex Corporation of Redwood City, California.

Considering the operation of the circuit system shown by FIG. 2 in response to an off-tape edit signal carried by the cue track, a cue tone signal in the form of a high-frequency signal burst is recorded onto the cue track at the desired point for the in-going edit splice and again at the point of the out-going edit splice. Thus, during an edit pass of tape 11, a cue tone detector 32 responds to the cue tones reproduced by head 13 and develops a rectangular waveform edit signal, such as shown in FIG. 4, having a width corresponding to the duration of the desired edit and leading and trailing edges respectively corresponding to the positions for the in-going and out-going edits. Detector 32 may be provided by any number of conventional circuits, such as a diode detector responsive to the signal burst and driving a bistable switching device. The output of detector 32 thus develops an edit signal which is passed through an electronic gate 33 to an input stage of shift register 31. Gate 33 and an additional gate 34 connected in the path of the manual and programmed edit signals, are provided to inhibit the edit functions in response to an inhibit command signal. The inhibit mode is useful in monitoring the positions of the recorded edit tones or cue tones prior to effecting the actual video and audio edit erasures and recordings.

Shift register 31 of the present invention responds to the edit signal at its input 36 to develop a sequence of signals corresponding to the input signal although delayed therefrom by selected amounts. The magnitude of the delay in each case is determined by the point at which the output from the shift register is taken. In this instance, a video erase circuit 37, an audio delay circuit 38, and a sequence switcher circuit 39 for the rotary heads are respectively connected to be operated by three different outputs from the shift register identified respectively as 20F, 32F and 34F.

An important feature of shift register 31 is that the delay functions that it provides are automatically phased and time quantized to the recorded video frame intervals such that the delay at any selected output stage consists of some multiple number of video frame periods. This is achieved by clocking the shift register by a train of reference frame pulses (as shown in FIG. 4), here applied to an input 41 of register 31, such that the input edit signal is shifted through the register stages upon the occurrence of each successive reference frame pulse. In accordance with the operation of conventional video tape recording equipment, the video tape is synchronized during a record mode such that the off-tape frame pulses, which correspond to the vertical synchronizing interval, occur in synchronism with the reference frame pulses which are normally available from a studio synchronizing generator. Accordingly, since it is only desirable to edit whole frames on the video tape, the edit timing operations, that is the erasures and new recordings, are timed in accordance with multiples of video frame periods. Thus, in response to the leading edge of an incoming edit signal at register input 36, a video erase command signal will be issued 20 frames (20F) subsequent thereto over an output line 42 to video erase delay circuit 37. Similarly, after 32 frames (32F) and 34 frames (34F), delayed edit command signals will be issued over lines 43 and 44 to circuits 38 and 39 respectively, for effecting the audio edits and the new video recording. The output signals developed on lines 42, 43 and 44 are best illustrated in FIG. 4. The particular delay periods illustrated in this instance correspond to a tape speed of 15 inches per second and a frame rate of 30 per second. It may be observed that at this tape speed, video erase head 17 and rotary head assembly 20 are spaced along tape 11 by the equivalent of approximately 14 video frame intervals or periods. Similarly, advance cue head 13 is spaced upstream from cue record head 14 by approximately 34 frame intervals. Advance cue head 13 must be displaced upstream from cue record 14 by the amount of the spacing between video erase head and rotary head assembly 20 in order to allow sufficient time for actuating the video erase function at video head 17. In regard to timing of the edit functions on the tape audio track, it will be observed that similar timing compensation must be provided between successive operation of audio erase head 28 and audio record/reproduce head 27 as has been provided for video erase head 17 and video record/reproduce head assembly 20. The timing difference in this instance is however provided within circuit 38 rather than by selecting different outputs of shift register 31 as described more fully in connection with FIG. 3. Apart from the timing difference between audio erase and audio record, the audio edit operations occur generally at the same time as the video recording edit. The apparent two frame period time separation between audio output 43 and video record/reproduce output 44 from register 31 is substantially eliminated or taken up by separate delay components within circuits 38 and 39.

Figure 3:
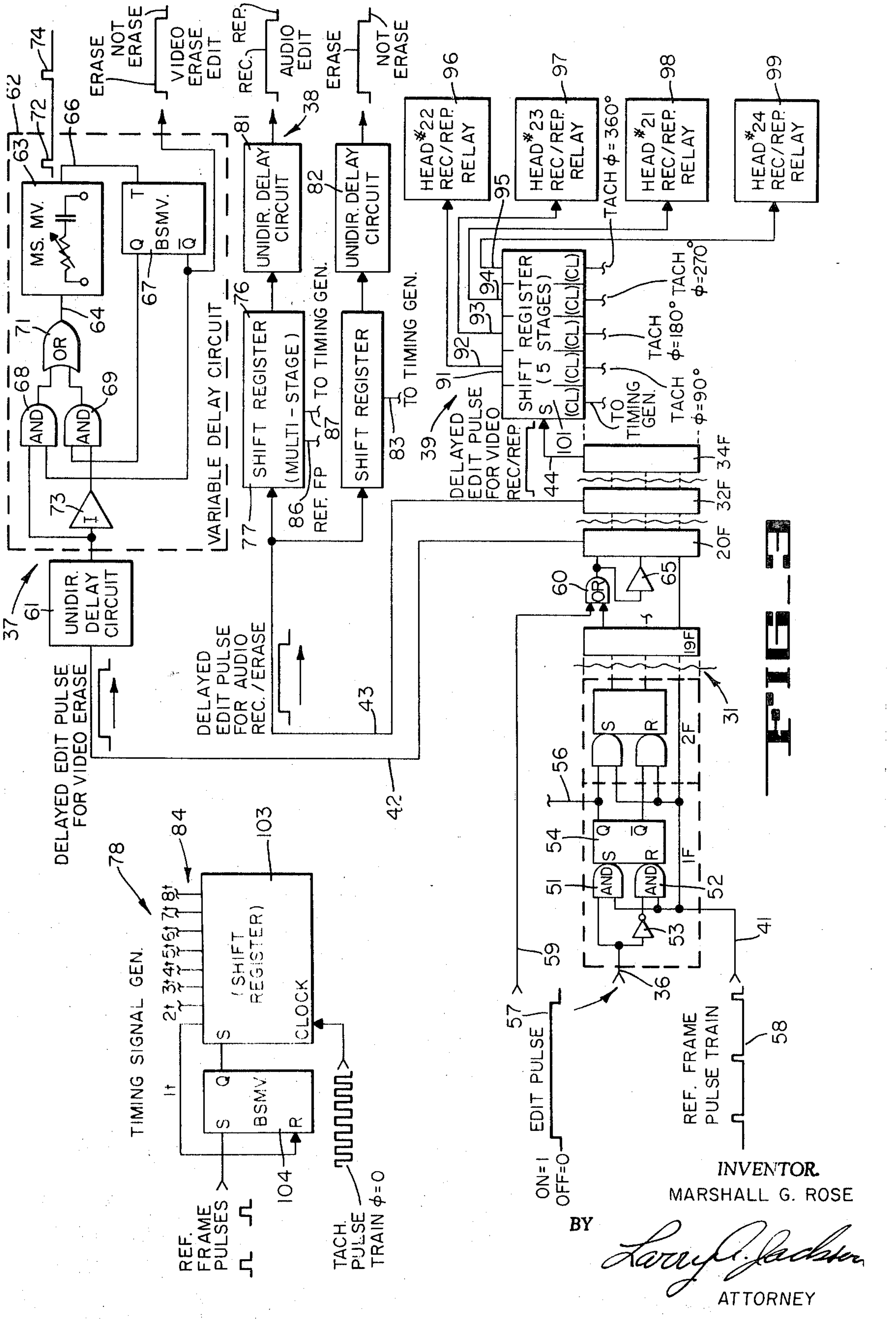
FIG. 3 is a more detailed schematic diagram of the circuit illustrated in FIG. 2.

With reference to FIG. 3, shift register 31 is shown as comprising a plurality of bistable bit stages 1F, 2F–19F, 20F–32F–34F–. The number of stages is limited only by the maximum delay desired. Each stage, as shown for stage 1F, is comprised of a pair of input AND-gates 51 and 52, an inverter 53, a bistable RS multivibrator 54 and an output 56. Shift register input 36 is connected jointly to one of the inputs of each of AND-gates 51 and 52 with inverter 53 being serially interposed one of these connections. Clocking input 41 is connected to the other inputs of each of AND-gates 51 and 52 and the corresponding AND gate inputs of the succeeding shift register stages.

Each edit signal received at input 36 of register 31, while occurring at random, is automatically time quantized to the reference frame pulse rate by virtue of the clocking operation of the register. For example, the leading edge of edit pulse 57 as shown in FIG. 3 may occur between any pair of reference frame pulses 58. However, the "on" state of pulse 57 is not clocked into the first stage, 1F, of the shift register until the occurrence of the first frame pulse. A similar operation occurs at the trailing edge of edit pulse 57. Thus, the edit timing pulse as it passes through each of the bit stages of shift register 31 is quantized in terms of frame periods greatly simplifying the actual switching operations occurring in response thereto.

Alternatively, edit pulse 57 may be a programmed edit signal for application to an input 59 extending to a downstream stage of shift register 31, as illustrated by FIG. 3. In this instance, input 59 is connected to apply an edit pulse signal to stage 20F through a gating network including an OR-gate 60 and an inverter 65. Gate 60 and inverter 65 function to permit receipt of an edit signal at input 59 without interfering with the normal response of the shift register to an edit pulse received at input 36. As indicated previously, signals applied to input 59 are already properly timed by an external computer such that the delay intervals provided by register stages 1F–19F may be circumvented.

Output 42 from stage 20F of register 31 provides a delayed edit signal in response to edit pulse 57 for energizing video erase head 17. This signal is passed through a unidirectional delay circuit 61 which may for example be provided by an RS bistable multivibrator of conventional configuration to cause a slight delay of the leading edge of the video erase pulse signal, leaving the timing of the trailing edge of the output signal the same as the applied pulse signal. In this regard, it has been found desirable to turn off erase head 17 slightly in advance of the time otherwise dictated by the edit signal so as to allow the residual erase field to dissipate before the succeeding and non-edited video material approaches erase gap 18.

Accordingly, a slight delay is provided by circuit 61 when turning the erase head on and the timing of the resulting signal is suitably adjusted by variable delay circuit 62 so as to reposition the leading edge or on-going erase edge of the resulting signal at the desired edit point. This causes the trailing edge or off-going erase edge of the signal to occur slightly in advance of the desired out-going edit point.

Variable delay circuit 62 is comprised of a monostable multivibrator 63 connected to operate in a retriggerable mode and having a variable RC network incorporated therein for adjusting the unstable time period of the multivibrator. A logic circuit is connected between an input 64 and an output 66 of multivibrator 63 so as to adjustably shift the timing or phase of both the leading and trailing edges of the pulse signal developed by unidirectional delay circuit 61. In particular, a bistable multivibrator 67 having a toggle type switching operation has its mutually exclusive Q and $\bar{Q}$ outputs connected to separate inputs of a pair of AND-gates 68 and 69. With multivibrator 67 initially in the logic condition indicated, AND-gate 68 is enabled to pass the leading edge of the output pulse signal from circuit 61 through an OR-gate 71 to input 64 of monostable multivibrator 63. M.S. multivibrator 63 responsively issues a pulse 72 having a period or width adjustable by a variable RC network of the multivibrator as shown. A toggle input of bistable multivibrator 67 is responsive to the negative going edge of pulse 72 appearing at output 66 and thus multivibrator 67 switches its logic state so as to enable gate 69 and disable gate 68. An inverter 73 causes an inverted trailing edge of the signal from circuit 61 to be applied through gates 69 and 71 to input 64 of multivibrator 63. Multivibrator 63 accordingly develops another pulse 74 having the same period or width as pulse 72 but occurring at the trailing edge of the input edit signal. Bistable multivibrator 67 responds to the negative going and trailing edge of pulse 74 to switch back to its initial logic condition restoring gates 68 and 69 to respond to the next incoming edit waveform. The adjusted output signal developed by circuit 62 is illustrated as the video erase edit and in this instance is obtained off the $\bar{Q}$ output of bistable multivibrator 67. As described more fully in the aforementioned application, Ser. No. 87,709, filed by myself and Charles W. Crum, the adjustment provided by circuit 62 is to position the start of the erasure at a point within the guard-band between adjacent transverse video tracks such that a clean edit erasure is effected.

With further reference to FIG. 3, audio erase circuit 38 is responsive to a suitably delayed audio edit signal over line 43 from shift register 31 and is comprised of an audio record/reproduce delay channel and an audio erase channel both responsive to output line 43. A shift register 76 in the audio record/reproduce channel and a shift register 77 in the audio erasure channel provide the necessary timing functions to compensate for the physical spacing between audio record and erase heads 27 and 28 shown by FIG. 1. Additionally, these shift registers with the aid of a timing signal generator 78 develop timing functions which are composed of fractionalized timing periods of a whole video frame interval. Each delay channel includes a unidirectional delay circuit, circuits 81 and 82 for the record and erase channels respectively, functioning in the similar manner and to provide the same general result as described in connection with unidirectional delay circuit 61 in the erase signal path.

Shift register 77 in particular provides for delaying the audio edit signal developed over line 43 by an amount corresponding to less than a full frame period. To achieve this, a clocking input 83 is disposed to be connected to one of a plurality of outputs 84 of timing signal generator 78, wherein outputs 84 provide signals at multiples of 1t interval following each reference frame pulse. In this instance, t corresponds to one-eighth of a frame interval or approximately 4 milliseconds for a 30 frames/sec. video signal standard. Thus, by selecting a suitable one of outputs 84 for connection to clocking input 83, shift register 77 delays the audio edit signal by a suitable partial frame amount for proper timing of the operation of audio erase head 28.

As audio record/reproduce head 27 is displaced downstream of audio erase head 28, shift register 76 must provide a greater delay than shift register 77, and in this instance register 76 is composed of several stages having their clocking input 86 connected to receive reference frame pulses and at least one further stage having its clocking input 87 adapted to be connected to a selected one of outputs 84 from timing signal generator 78. This provides several video frames and a partial video frame delay in the audio record/reproduce edit path. In this instance, the audio edit signal developed by shift register 76 and unidirectional delay circuit 81 provide for switching head 27 from its reproduce to its record mode at the in-going edit splice and vice versa at the out-going edit splice.

Finally, the delayed edit command signal issued over line 44 by shift register 31 for switching the rotary heads of assembly 20 into and out of the record mode is received by a multistage shift register 91. Register 91, in this instance, consists of five stages with the last four stages providing outputs 92, 93, 94, and 95 for issuing signals having progressively increasing time delays to and for successively operating the record/reproduce switching relays 96, 97, 98 and 99 associated with heads 22, 23, 21 and 24 respectively. The relative timing of these signals is best shown by FIG. 4. Shift register 91 in association with relays 96 through 99 functions to provide the sequence switcher circuit 39 discussed in connection with FIG. 2 such that each of the individual transducer heads carried by assembly 20 are switched from the reproduce mode to a record mode and vice versa in the proper order or sequence causing a smooth transition between the new and old video record tracks at the edit splice. For example, assume that in the presently described embodiment it is desired to delay the video record/reproduce transition 35 frames from the leading and trailing edges of the edit pulse signal applied at input 36 of shift register 31. Shift register 91 is inserted in the delay path so as to break down the final delay period, that is the 35th frame interval, into certain preselected fractions thereof which are selectively timed so as to operate the various head relays in a desired sequence. Accordingly, a first stage 101 of shift register 91 is clocked by a selected one of outputs 84 of generator 78. In this instance an output **8*t* is utilized so as to clock stage 101 at a time approaching the time of the frame pulse corresponding to the desired delay of 35 frames. Each of the succeeding stages of shift registers 91 are clocked by suitably timed clocking signals here derived from a multiphase tachometer signal generated by an electronic tachometer (not shown) coupled to rotate with head wheel assembly 20**. The multiphase tachometer signal employed for this purpose is disclosed in greater detail in copending U.S. applications Ser. No. 25,052 filed Apr. 2, 1970, for AUTOMATIC PHASING OF SERVO SYSTEMS and Ser. No. 25,054, filed Apr. 2, 1970, for BRUSHLESS DC MOTOR INCLUDING TACHOMETER COMMUTATION CIRCUIT, both by Harold V. Clark and both assigned to the present assignee.

Timing signal generator 78 is provided by a shift register 103 consisting of eight stages respectively associated with the outputs 84 (**1*t*–8*t*). An RS bistable multivibrator 104 has its Q output connected to the set input of register 103 and the output of the first stage register 103 is returned to the reset input of multivibrator 104. The set input of multivibrator 104 responds to each incoming reference frame pulse to set the first stage of shift register 103 whereupon the clocking input thereof responds to a pulse train developed by the head wheel tachometer referred to above, to clock the signal initially stored on the first stage down through the eight available shift register stages to successively energize outputs 2*t* through 8*t*. In this manner, the frame period is broken down into eight equal timing segments which as discussed above are utilized by shift registers 76, 77 and 91 to develop desired partial frame timing functions. Each of the outputs 1*t* through 8*t* is thus triggered in response to an edge of the head wheel tachometer pulse train which in this instance consists of eight periods for each reference frame pulse period. Furthermore, as described in applications Ser. Nos. 25,052, and 25,054, the tachometer pulse signal is provided in eight phases equally spaced at 45°. The tachometer pulse train applied to the clocking input of shift register 103 is selected to have a phase of zero whereas the tachometer signals applied to the last four stages of shift register 91** are selected to have relative phases of 90°, 180°, 270° and 360° as indicated.

What is claimed is:

1. In an electronic editing system for video recordings on a magnetic tape carried by a transport of the type having a rotary scan video record/reproduce head assembly and a stationary video erase head spaced upstream in the tape path from such assembly, the combination comprising:
   - a shift register means having a plurality of bit stages each having an output, one of said outputs being connected to and for operating said video erase head and another of said outputs being connected to and for switching said rotary head assembly between reproduce and record modes;
   - input circuit means adapted to receive an edit command signal and apply such signal to the first stage of said shift register means; and
   - clocking circuit means adapted to receive a periodic pulse train representing the frame rate of the video signal, said clocking circuit means connected to said shift register to clock each of said bit stages at the video frame rate, whereby said shift register times the operation of said erase head and the switching of said rotary record/reproduce head assembly to compensate for the physical spacing therebetween.

2. In the system as described in claim 1 wherein the transport includes audio record/reproduce and erase heads, the combination further comprising audio circuit means connecting certain of said stage outputs to and for operating said audio heads, whereby the shift register delays the operation of said audio heads by an amount corresponding to the relative physical spacing thereof from said rotary heads and video erase heads.

3. In the system as described in claim 1 wherein the transport further includes a record/reproduce cue head disposed downstream from the rotary head and an advance cue read head disposed upstream from the video erase head, the combination further comprising cue circuit means adapted to receive a cue signal off tape from the cue reproduce head and being connected to the input of said shift register to provide said input edit command signal thereto.

4. In the system of claim 1, the combination further comprising shift register means connected between the output of one of said first-named shift register stages and said rotary heads for sequentially switching each of said heads between reproduce and record modes.

* * * * *